(12) United States Patent
Kondo et al.

(10) Patent No.: US 6,720,671 B2
(45) Date of Patent: Apr. 13, 2004

(54) WIRE HARNESS FOR VEHICLE SEAT

(75) Inventors: Masayuki Kondo, Shizuoka-ken (JP); Kazuhiro Kawachi, Aichi-ken (JP)

(73) Assignees: Yazaki Corporation, Tokyo (JP); Toyota Jidosha Kabushiki Kaisha, Aichi-ken (JP)

( * ) Notice: Subject to any disclaimer, the term of this patent is extended or adjusted under 35 U.S.C. 154(b) by 1 day.

(21) Appl. No.: 09/974,869

(22) Filed: Oct. 12, 2001

(65) Prior Publication Data

US 2002/0050730 A1 May 2, 2002

(30) Foreign Application Priority Data

Oct. 13, 2000 (JP) ...................................... P2000-313860

(51) Int. Cl.[7] .................................................. B60L 1/00
(52) U.S. Cl. ..................................... 307/10.1; 174/72 A
(58) Field of Search ............................... 307/9.1, 10.1; 439/623; 174/72 A

(56) References Cited

U.S. PATENT DOCUMENTS 6,429,544 B1 * 8/2002 Sasaki et al. ............... 307/10.1
6,462,279 B1 * 10/2002 Serizawa et al. ........... 174/72 A

FOREIGN PATENT DOCUMENTS

JP 11-018862 1/1999
JP 11-198690 7/1999

* cited by examiner

Primary Examiner—Gregory J. Toatley, Jr.
Assistant Examiner—Sharon A. Polk
(74) Attorney, Agent, or Firm—Finnegan, Henderson, Farabow, Garrett & Dunner, L.L.P.

(57) ABSTRACT

A wire harness for a vehicle seat is disposed in the vehicle seat and electrically connects electric parts to one another. The wire harness includes a flat circuit branch and a flat circuit body. The flat circuit body has one end connected to the circuit branch while the other end is connected to various electrical parts. The circuit branch also includes a sheet of branch seat or several sheets of branch seats that are selectively laminated to one another so that an electronic circuit corresponding to the specification or grade of the vehicle seat can be constituted.

4 Claims, 6 Drawing Sheets

PRIOR ART

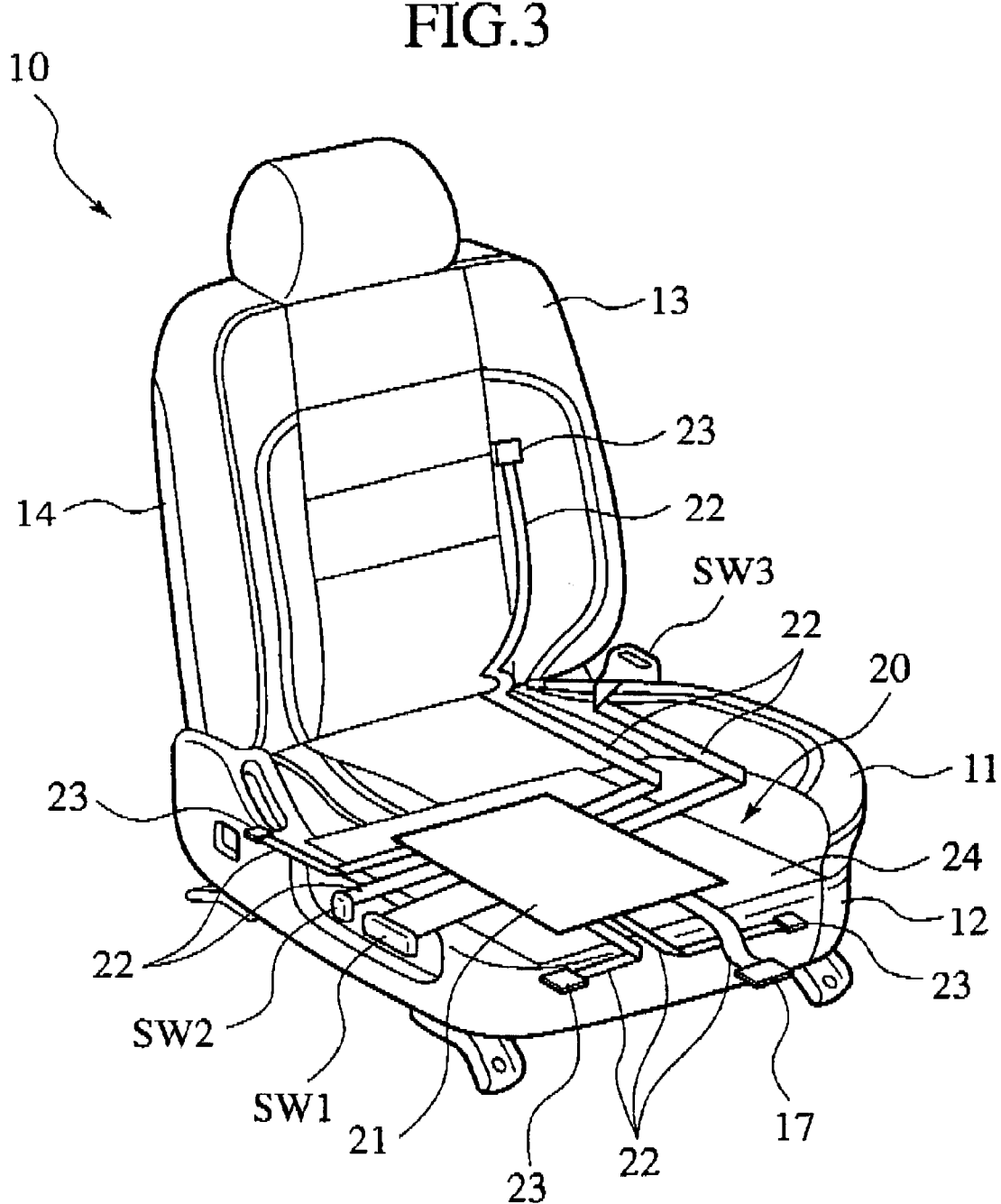

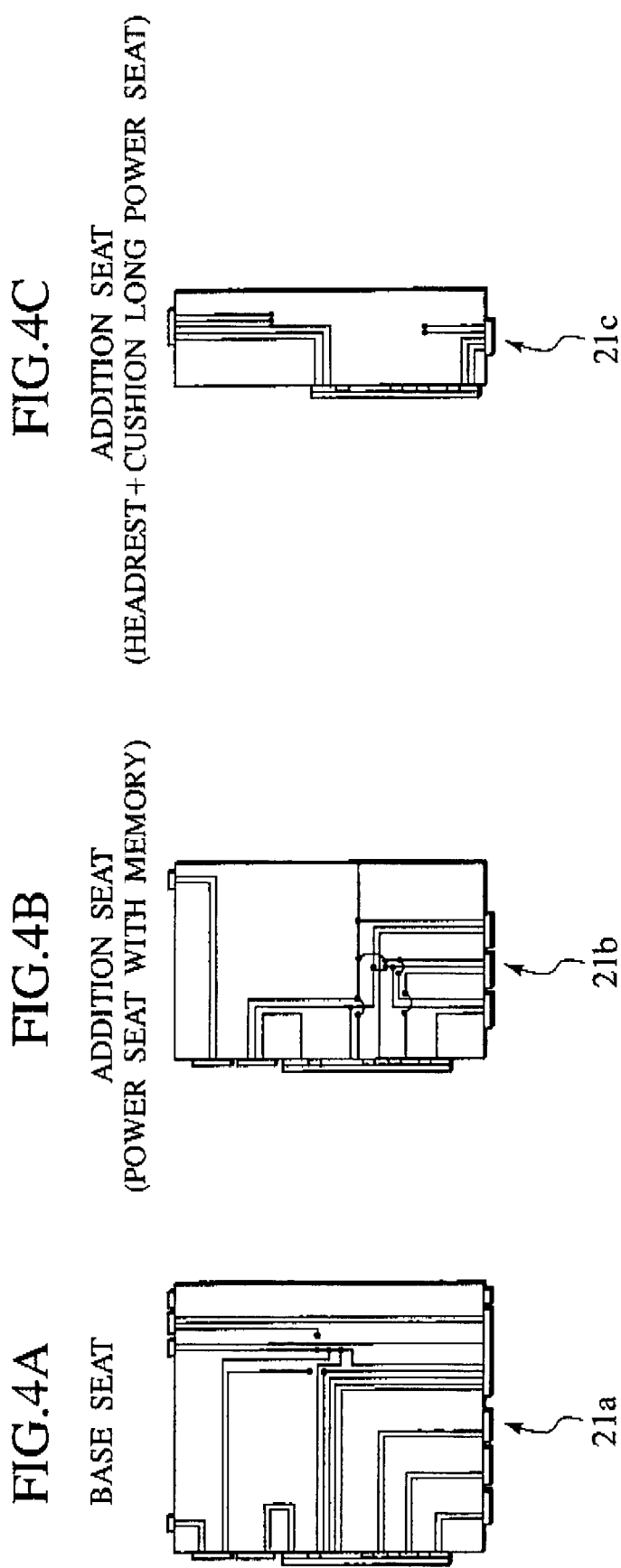

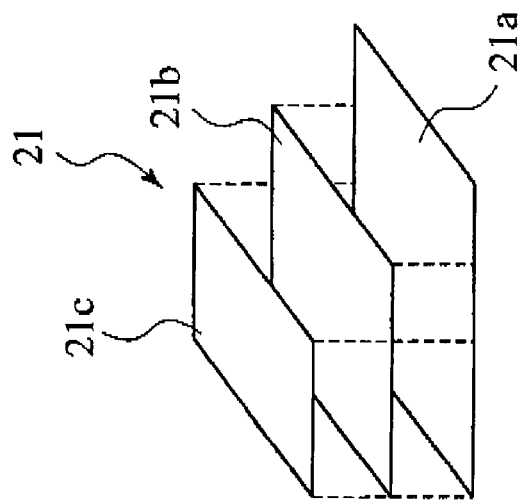
FIG.5C THREE SUPERPOSED SEATS
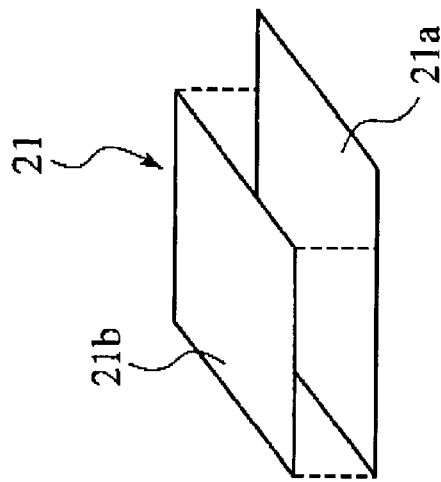
FIG.5B TWO SUPERPOSED SEATS
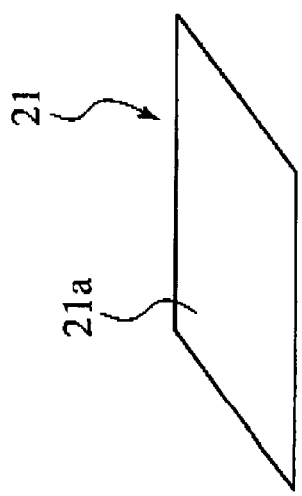
FIG.5A ONE SEAT

WIRE HARNESS FOR VEHICLE SEAT

BACKGROUND OF THE INVENTION

1. Field of the Invention

The present invention relates to a wire harness for a vehicle seat disposed in the vehicle seat.

2. Description of the Related Art

A vehicle seat is provided with an electric seat apparatus which adjusts a position of a seat cushion in a longitudinal direction and a vertical direction in accordance with a posture of a passenger or for reclining a seat back, or with an air bag unit apparatus for inflating an air bag between the passenger and a side door. In the vehicle seat having such an apparatus, a wire harness is disposed.

A proposed wire harness structure for such a vehicle seat will be explained using FIG. 1. In FIG. 1, a vehicle seat 1 includes a seat skeleton 2 on the side of a seat cushion and a seat skeleton 3 on the side of a seat back. The seat skeleton 2 on the side of the seat cushion is provided with switches such as a main switch SW1, a lamber support switch SW2 and a buckle switch SW3, and first to fourth motors M1 to M4 which are driving sources for adjusting a position of the seat cushion and an inclined position of the seat back. The seat skeleton 3 on the side of the seat back is provided with a fifth motor M5 which is a driving source for adjusting a back-abutting position of the seat back and an air bag unit 4.

Wire harnesses 5 are disposed in the vehicle seat 1 so that the motors M1 to M5 receive driving signals and electric power supply based on operation signals from the switches SW1 to SW3, the switches SW1 to SW3 receive output the operation signals for controlling the motors M1 to M5 or receive the electric power supply, and the air bag unit 4 output the inflating signal or receive the electric power supply.

The wire harness 5 comprises electric wires having substantially circular cross section covering insulative material bound around an outer periphery of conductive material for example, and the wire harnesses disposed between the same routes are covered with exterior material (not shown) such as corrugate tube, VO tube or the like. Each the wire harness 5 covered with the exterior material is fixed to the seat skeletons 2 and 3 by a clamp member 6 or fixed to a spring 8 of the seat cushion by a tie band member 7. That is, the wire harnesses 5 prevent interference damage to the utmost with respect to the vehicle seat 1 by covering the wire harnesses 5 with the exterior material, and keep appropriate disposing state by fixing the wire harnesses 5 to the seat skeletons 2 and 3.

However, in the case of the conventional wire harness 5, since most of portions of the wire harnesses 5 are covered with the exterior material to prevent the interference damage to the utmost with respect to the vehicle seat 1 as described above, this inhibits automatization for producing the wire harness 5.

Further, since the wire harnesses 5 are assembled into the vehicle seat 1 in such a manner than portions of the wire harnesses are fixed using the clamp member 6 or the tie band member 7, the number of fixing portions is great, the two kinds of fixing members, i.e., the clamp member 6 or the tie band member 7 must be used, and there is a problem that the assembling performance is inferior.

To solve such problems, the present applicant proposed a wire harness for a vehicle seat comprising a flat-like circuit branch and a flat circuit body whose one end is connected to the circuit branch and whose other end is connected to an electric part. In this wire harness for the vehicle seat, the circuit branch and the peripheral flat circuit body are supported by a protection seat, and the wire harness can be fixed to the vehicle seat through the protection seat. With this arrangement, it is possible to prevent the damage caused by interference with respect to the vehicle seat, to enhance the automatization for producing the wire harness, and to enhance the assembling operability of the harness to the vehicle seat.

Meanwhile, required function is varied depending upon the specification or grade of the vehicle seat. In the wire harness for the vehicle seat, it is conceived that different circuit branches are prepared for different specifications or grades of the vehicle seat so as to meat the specification or grade of the vehicle seat. However, if different circuit branches are prepared for different specifications or grades of the vehicle seat, there is a problem that the number of parts is increased. Further, it is conceived that an electronic circuit of the circuit branch is set to the highest specification or highest grade. However, if the circuit branch has the highest function, there is a problem that the circuit branch is increased in size and the cost is increased.

SUMMARY OF THE INVENTION

It is an object of the present invention to provide a wire harness for a vehicle seat in which the number of parts of a circuit branch is reduced to the minimum level for standardization, the disposing space of the circuit branch is reduced to the minimum level, the cost is low, and the wire harness can meet a specification or grade of the vehicle seat.

According to a first aspect of the present invention, there is provided a wire harness for a vehicle seat disposed in the vehicle seat for electrically connecting electric parts to one another, comprising flat circuit branch, and a flat circuit body whose one end is connected to the circuit branch and whose other end is connected to the electric parts, wherein the circuit branch comprises a sheet of branch seat or a plurality of sheets of branch seats selectively laminated on one another so that an electronic circuit corresponding to specification or grade of the vehicle seat can be constituted.

With this wire harness for a vehicle seat, the branch seat of the circuit branch is selected in accordance with the specification or grade of the vehicle seat. If the number of the selected branch seat is one, this one branch seat is used as the circuit branch, and if two or more branch seats are selected, these are laminated and used. As the number of parts of the circuit branch, the branch seat having the basic function and one or more addition seats each having the additional function suffice, and only necessary branch seat of these branch seats is used.

According to a second aspect of the invention, the branch seat is provided with a notch for exposing a conductive portion of another branch seat to be laminated.

With this wire harness for a vehicle seat, in addition to the effect of the first aspect, the plurality of branch seats are laminated on one another, and even if a conductive portion of the branch seat exists on the superposed surface, the flat circuit body can electrically be connected to the conductive portion of the desired branch seat by the-notch.

According to a third aspect of the invention, the branch seat has a memory and an electronic control unit for controlling using contents of the memory, and the electronic control unit is constituted by a flat circuit.

With this wire harness for a vehicle seat, in addition to the effect of the first or second aspect, one having the memory and the electronic control unit can be added as the branch seat.

BRIEF DESCRIPTION OF THE DRAWINGS

FIG. 3 shows the embodiment of the invention, and is a perspective view of the vehicle seat on which the electric seat apparatus and the like are mounted;

FIGS. 4A, 4B and 4C show the embodiment of the invention. and are schematic plan views of branch seats of the circuit branch;

FIGS. 5A, 5B and 5C shows the embodiment of the invention, and are schematic perspective views of the circuit branch when the circuit branch is allowed to meet the specification or grade of the vehicle seat.

DESCRIPTION OF PREFERRED EMBODIMENT

An embodiment of the present invention will be explained based on the drawings below.

Figure 1:
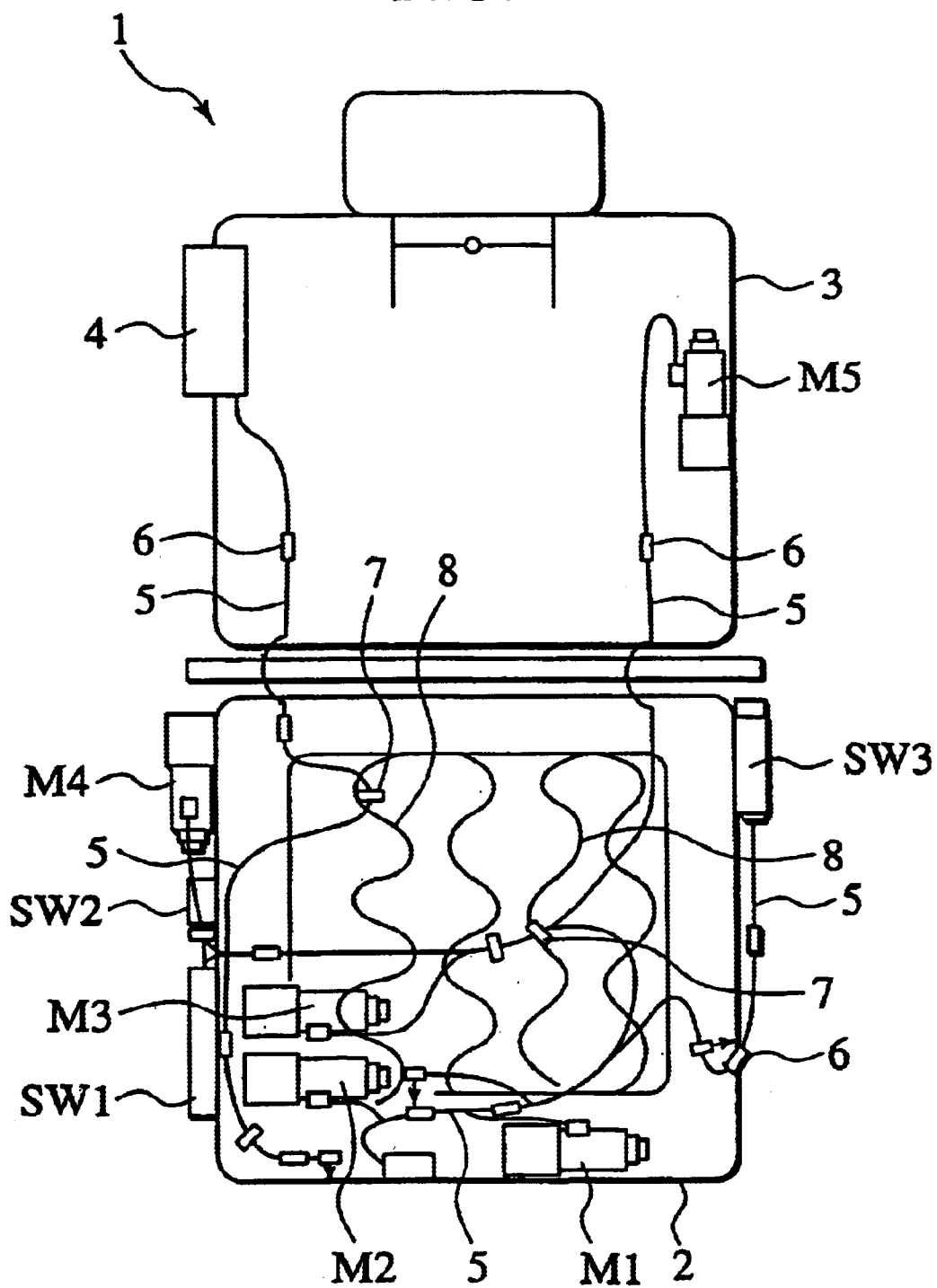
FIG. 1 is a developed plan view of a vehicle seat on which an electric seat apparatus and the like are mounted.
Figure 2:
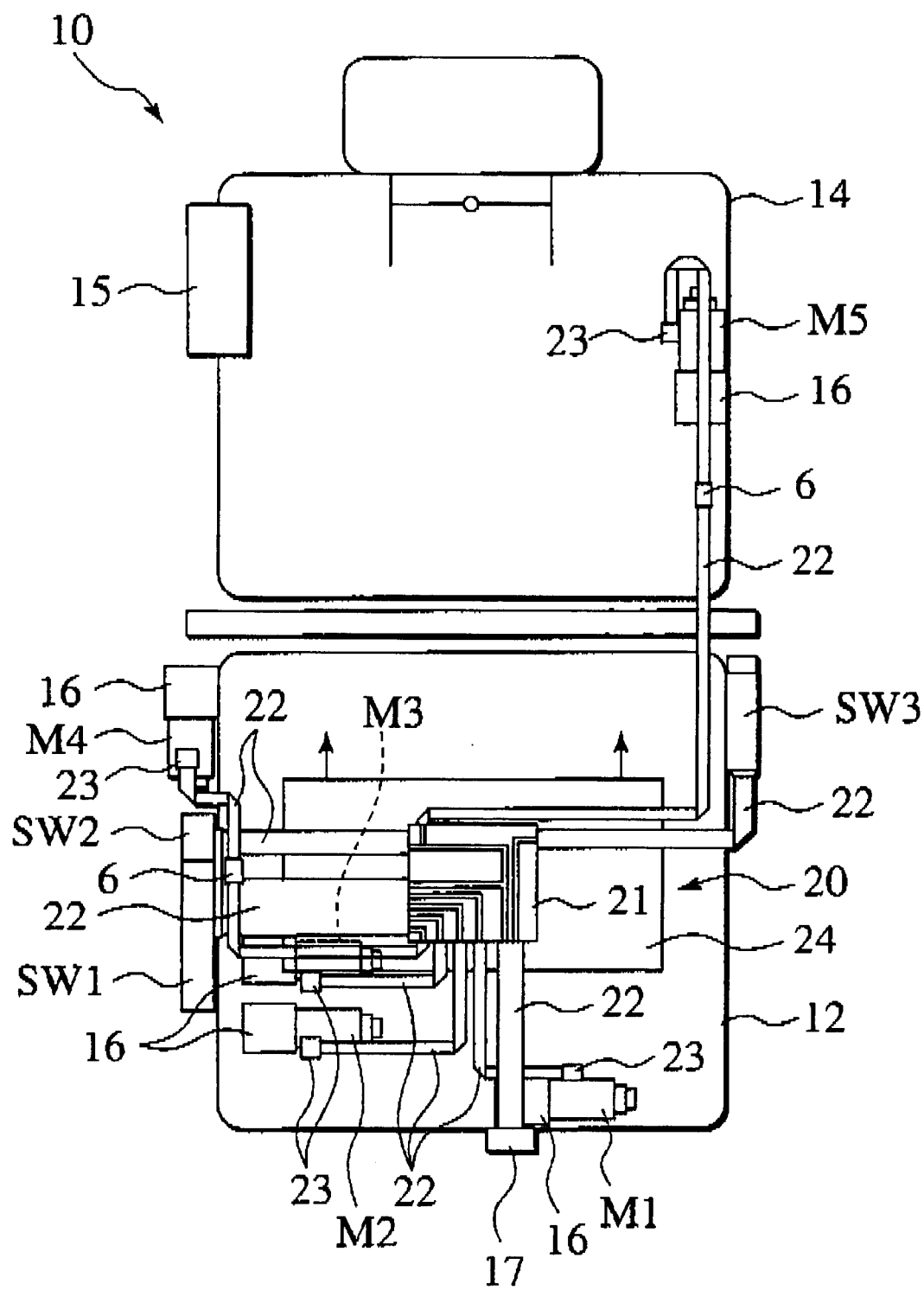
FIG. 2 shows an embodiment of the present invention, and is a developed plan view of a vehicle seat on which an electric seat apparatus and the like are mounted.
Figure 6:
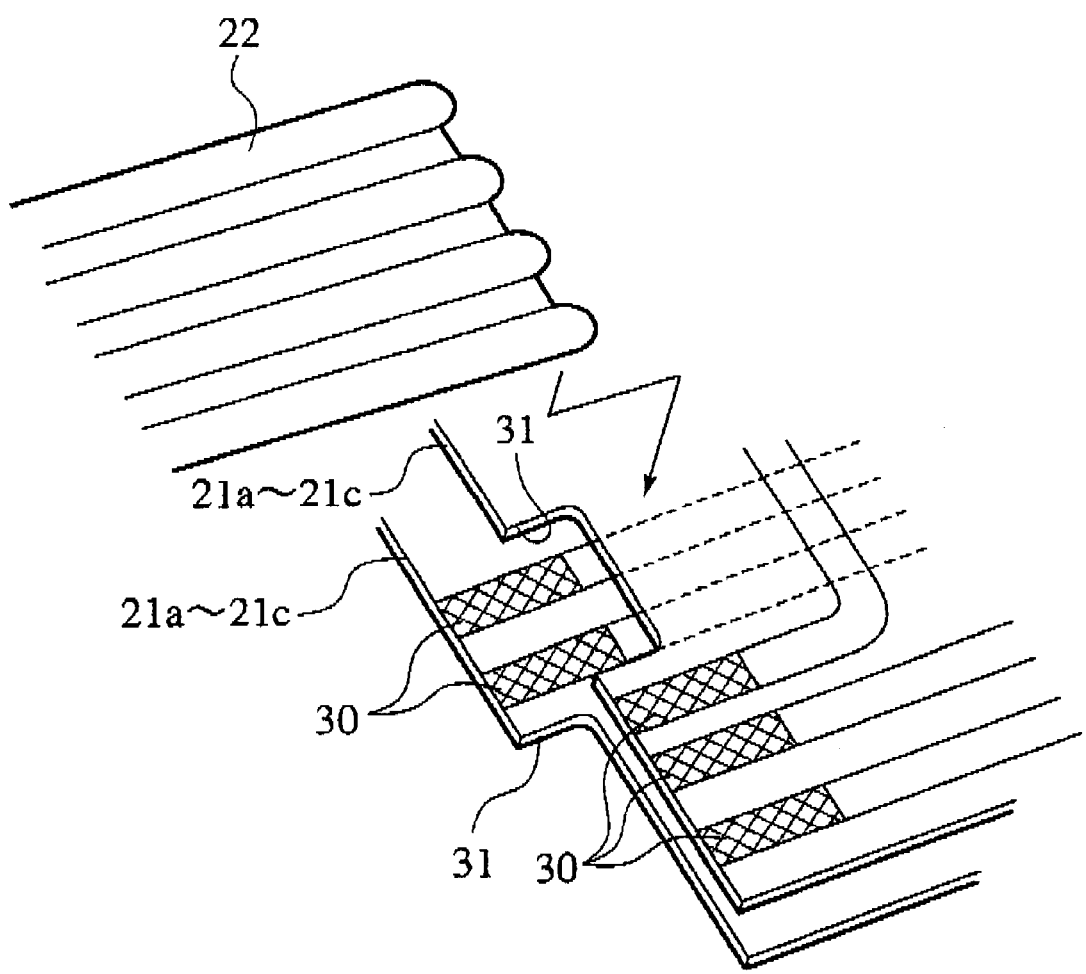
FIG. 6 is a perspective view of an essential portion showing details of the branch seat and one end of a flat circuit body.

As shown in FIGS. 2 and 6, a vehicle seat 10 includes a seat skeleton 12 on the side of a seat cushion 11, and a seat skeleton 14 on the side of a seat back 13 rotatably provided behind the seat skeleton 12. The seat skeleton 12 on the side of the seat cushion 11 includes switches (electric parts) such as a main switch SW1, a lamber support switch SW2 and a buckle switch SW3, as well as first to fourth motors (electric parts) M1 to M4 which are driving sources for adjusting a position of the seat cushion 11 and an inclining position of the seat back 13. The seat skeleton 14 on the side of the seat back 13 includes an air bag unit (electric part) 15 and a fifth motor (electric part) M5 which is a driving source for adjusting a back-abutment position of the seat back 13. The motors M1 to M5 are fixed to the seat skeletons 12 and 14 by clamp members 16, The seat skeleton 12 is provided with a power-supply connector 17 which is an electric part for receiving power supply from a vehicle body.

A vehicle seat wire harness 20 is disposed in the vehicle seat 10 so that driving signals are input to the motors M1 to M5 based on operation signals from the predetermined switches SW1 to SW3 or the motors M1 to M5 receive power supply, the switches SW1 to SW3 output the operation signals or receive the power supply, and the power-supply connector 17 guides the power from the vehicle body.

The vehicle seat wire harness 20 comprises a flat circuit branch 21, and a plurality of flat circuit bodies 22 whose one ends are connected to the circuit branch 21 and whose other ends are connected to the motors M1 to M5, the switches SW1 to SW3 and the power-supply connector 17 which are electric parts. That is, on the vehicle seat wire harness 20, the flat circuit bodies 22 are disposed radially around the circuit branch 21, thereby establishing electric connection between the electric parts (motors M1 to M5 the switches SW1 to SW3 and the power-supply connector 17).

As shown in FIGS. 4A, 4B, 4C, 5A, 5B and 5C, the circuit branch 21 is formed in such a manner that a single branch seat 21a is disposed or a plurality of branch seats 21a to 21c are selectively laminated, and the result is punched by a flexible printed circuit (FPC) or press die and then, the result is formed into a flat shape by a die stamping circuit body which is subjected to laminate working. The circuit branch 21 joints circuits which are guided by the flat circuit bodies 22, and a connection position on the side of one end of the flat circuit bodies 22 is set to a position where wires can easily be connected to the electric parts to which the flat circuit bodies 22 are connected. That is, a connection route between the circuit branch 21 and each of the electric parts is set to a position where the connection route is of straight or of simple shape such as a shape which is bent once. The circuit branch 21 is connected to the one ends of the flat circuit bodies 22 by pressure welding, crimping, so-called piercing, resistance welding, ultrasonic welding, soldering, conductive adhesive or the like.

Each of the flat circuit bodies 22 comprises a flat wire member such as a flexible flat cable (FFC), a flexible printed circuit (FPC) and a flat electric wire. The other ends of the flat circuit bodies 22 are connected to the electric parts through connectors 23.

Portions of the circuit branch 21 and the flat circuit bodies 22 around the circuit branch 21 are supported by a laminated like protection seat 24. Clamp members (not shown) are mounted to suitable portions of the protection seat 24. The clamp members are fixed to the seat skeleton 12, and the circuit branch 21 and the flat circuit bodies 22 are assembled to the seat skeleton 12 through the protection seat 24. The protection seat 24 follows deformation of a spring (not shown) of the vehicle seat 10 or disposed below the bottom dead center of the spring, and the protection seat 24 is fixed to the seat skeleton 12 at that position.

As to portions whose shape may not be maintained by fixing the protection seat 24 to the seat skeleton 12, a flat circuit body 2 is fixed to the skeletons 12 and 14 using a clamp member 6.

As shown in FIGS. 4A to 4C, the branch seats 21a to 21c includes three kinds of seats, i.e., the base seat 21a and the to two kinds of addition seats 21b and 21c. The base seat 21a constitutes an electronic circuit having a basic function. In this embodiment, the base seat 21a constitutes an electronic circuit having basic functions of a manual power seat, a buckle switch, seat heat and aside air bag. One of the addition seats 21b is a power seat having a memory in this embodiment, the addition seat 21b includes a memory (not shown), and constitutes the electronic circuit having additional function of the power seat. The addition seat 21b includes an electronic control unit (not shown) for control using the contents of the memory, and this electronic control unit is constituted by a flat circuit portion such as a flexible printed circuit (FPC). As concrete control, a posture of the vehicle seat 10 is stored in the memory, and the electronic control unit controls the electric seat apparatus based on the memory information. The other addition seat 21c is a headrest + cushion long power seat in this embodiment. The addition seat 21c constitute an electronic circuit of additional functions of the head rest and the cushion long power seat.

As shown in FIGS. 5A to 5C, the three kinds of branch seat can respectively form electronic circuits having suitable specifications and grades of the vehicle seat 10 by disposing only one base seat 21a, by laminating the branch seat 21a and the addition seat 21B, or by laminating the branch seat 21a and the two addition seats 21b and 21c. A desired electronic circuit may be formed by electrically connecting the laminated branch seats 21a to 21c at suitable locations thereof in some cases, Further, as shown in FIG. 6, the branch seats 21a to 21c are provided at their suitable locations with notches 31 for exposing conductive portions 30 of other branch seats 21a to 21c which are to be laminated. The conductive portions 30 are exposed by the notches 31 even after the branch seats 21*a* to 21*c* are laminated on one another.

The operation of the above structure will be explained next. The branch seats 21*a* to 21*c* of the circuit branch 21 are selected in accordance with the specification or grade of the vehicle seat 10. If the number of the selected branch seats 21*a* to 21*c* is one, the one branch seat 21*a* is used as the circuit branch 21 as shown in FIG. 5A. If the number of the selected branch seats 21*a* to 21*c* is more than two, these seats are laminated and used as shown in FIGS. 5B and 5C. That is, as the number of parts of the circuit branch 21, the branch seat 21*a* having the basic function and one or more addition seats 21*b* and 21*c* (two in this embodiment) each having the additional function suffice, and only necessary branch seat of these branch seats 21*a* to 21*c* is used. Therefore, it is possible to reduce the number of parts of the circuit branch 21 to the minimum level to standardize the parts, to reduce the space in which the circuit branch 21 is disposed to the minimum level, and to provide an inexpensive harness which can meet specification or grade of the vehicle seat 10.

In this embodiment, the branch seats 21*a* to 21*c* are provided with the notches 31 for exposing the conductive portions 30 of the other branch seats 21*a* to 21*c* to be laminated. Therefore, it is possible to electrically connect the one end of the flat circuit bodies 22 to the conductive portions 31 of the desired branch seats 21*a* to 21*c* by the notches 31 even if the plurality of branch seats 21*a* to 21*c* are laminated on one another and the conductive portions 30 of the branch seats 21*a* to 21*c* exist on the superposed surfaces. This facilitates the connecting operation between the one end of the flat circuit bodies 22 and the branch seats 21*a* to 21*c*.

In this embodiment, in the branch seat 21*b* having the memory and the electronic control unit for controlling using the contents of the memory, the electronic control unit is constituted by the flat circuit portion. Therefore, since one having the memory and the electronic control unit can be added as the branch seat 21*b*, the branch seat 21 can meet specification or grade of the vehicle seat 10 having high function.

Although the three kinds of branch seats 21*a* to 21*c* are prepared as the circuit branch 21, and a desired electronic circuit is constituted by laminating these seats selectively in the above embodiment, two, four or more kinds of branch seats may be employed. The present invention was applied to the wire harness of the electric seat apparatus and the like, but the invention can also be applied only if the wire harness 20 for the vehicle seat is disposed in the vehicle seat 10.

What is claimed is:

1. A wire harness for a vehicle seat disposed in the vehicle seat for electrically connecting electric parts to one another, comprising:

a flat circuit branch; and a flat circuit body having one end connected to the circuit branch and another end connected to the electrical parts;

wherein said flat circuit branch comprises a branch seat selected from a plurality of branch seats, or a plurality of branch seats selected from the plurality of branch seats, laminated on one another so that an electronic circuit corresponding to a specification of said vehicle seat can be constituted.

2. The wire harness for a vehicle seat for according to claim 1, wherein:

at least one of said plurality of branch seats has a memory and an electronic control unit for controlling using contents of the memory.

3. A wire harness for a vehicle seat disposed in the vehicle seat for electrically connecting electric parts to one another, comprising:

a flat circuit branch; and a flat circuit body whose one end is connected to the circuit branch and whose other end is connected to the electrical parts;

wherein said flat circuit branch comprises a branch seat or a plurality of branch seats selectively laminated on one another so that an electronic circuit corresponding to a specification of said vehicle seat can be constituted, at least one of said plurality of branch seats being provided with a notch for exposing a conductive portion of another one of said plurality of branch seats.

4. The wire harness for a vehicle seat for according to claim 3, wherein:

at least one of said plurality of branch seats has a memory and an electronic control unit for controlling using contents of the memory.

* * * * *